United States Patent
Hata

(10) Patent No.: US 7,574,211 B2
(45) Date of Patent: Aug. 11, 2009

(54) MOBILE COMMUNICATION TERMINAL

(75) Inventor: Yoshiaki Hata, Nishitokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 679 days.

(21) Appl. No.: 11/388,305

(22) Filed: Mar. 22, 2006

(65) Prior Publication Data
US 2007/0161399 A1    Jul. 12, 2007

(30) Foreign Application Priority Data
Jan. 6, 2006    (JP)    ............... 2006-001575

(51) Int. Cl.
H04W 36/00    (2009.01)
(52) U.S. Cl. ............ 455/436; 455/452.1; 455/573; 455/572; 370/328; 370/329; 370/331
(58) Field of Classification Search ......... 455/436–444; 370/331, 328
See application file for complete search history.

(56) References Cited

U.S. PATENT DOCUMENTS
2004/0233869 A1* 11/2004 Uchida .................. 370/329

FOREIGN PATENT DOCUMENTS
JP    2002-345019    11/2002

* cited by examiner

Primary Examiner—Charles N Appiah
Assistant Examiner—Amancio Gonzalez
(74) Attorney, Agent, or Firm—Frishauf, Holtz, Goodman & Chick, P.C.

(57) ABSTRACT

In a mobile communication terminal, when a base station of a communication destination is switched from a base station having a first communication rate to a base station having a second communication rate higher than the first communication rate, a calculated remaining communication time necessary to complete a data communication from the switching time point on the basis of a remaining amount of data which has not communicated yet, before the switching. The mobile communication terminal then display the calculated remaining communication time.

11 Claims, 5 Drawing Sheets

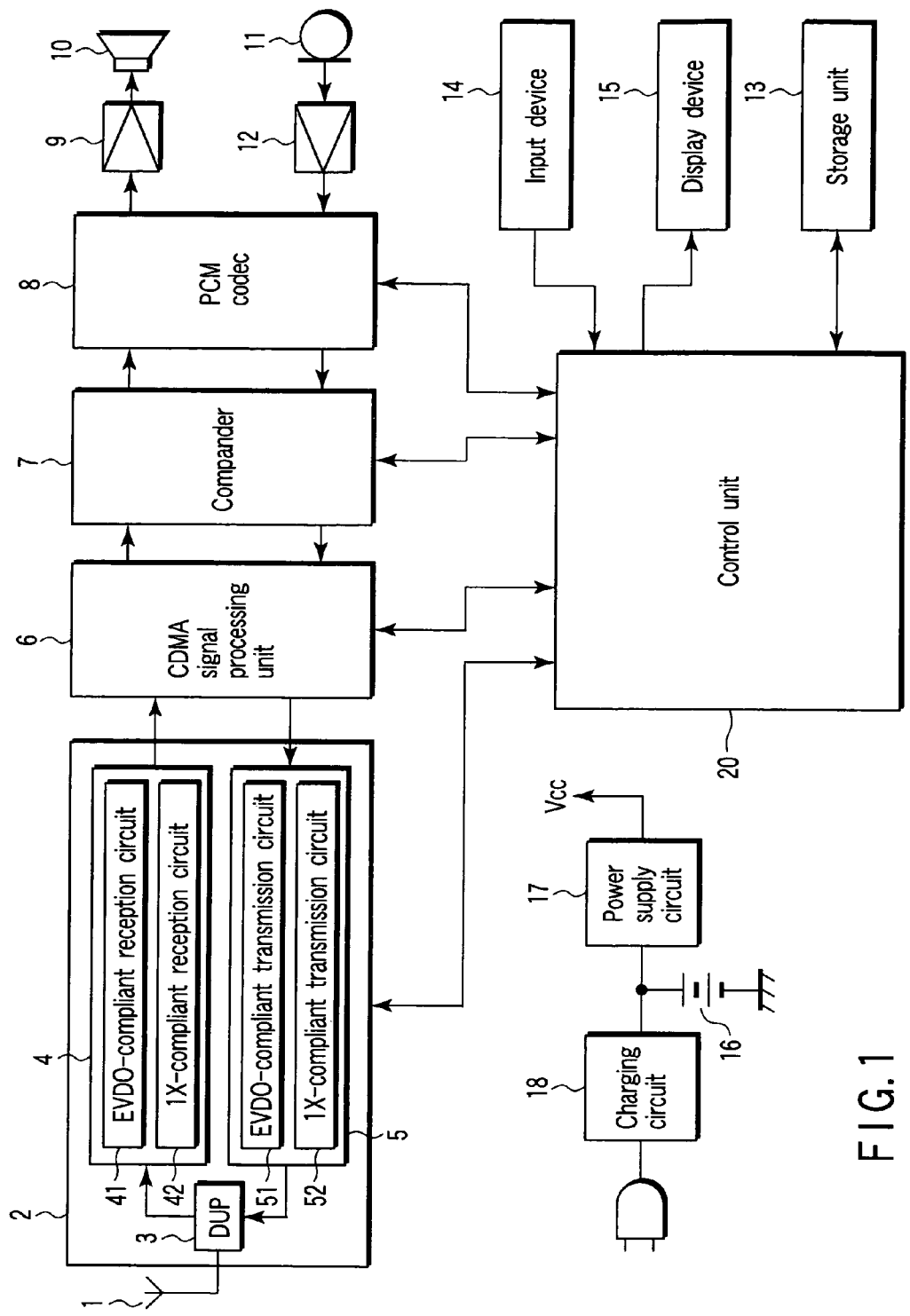
F I G. 1

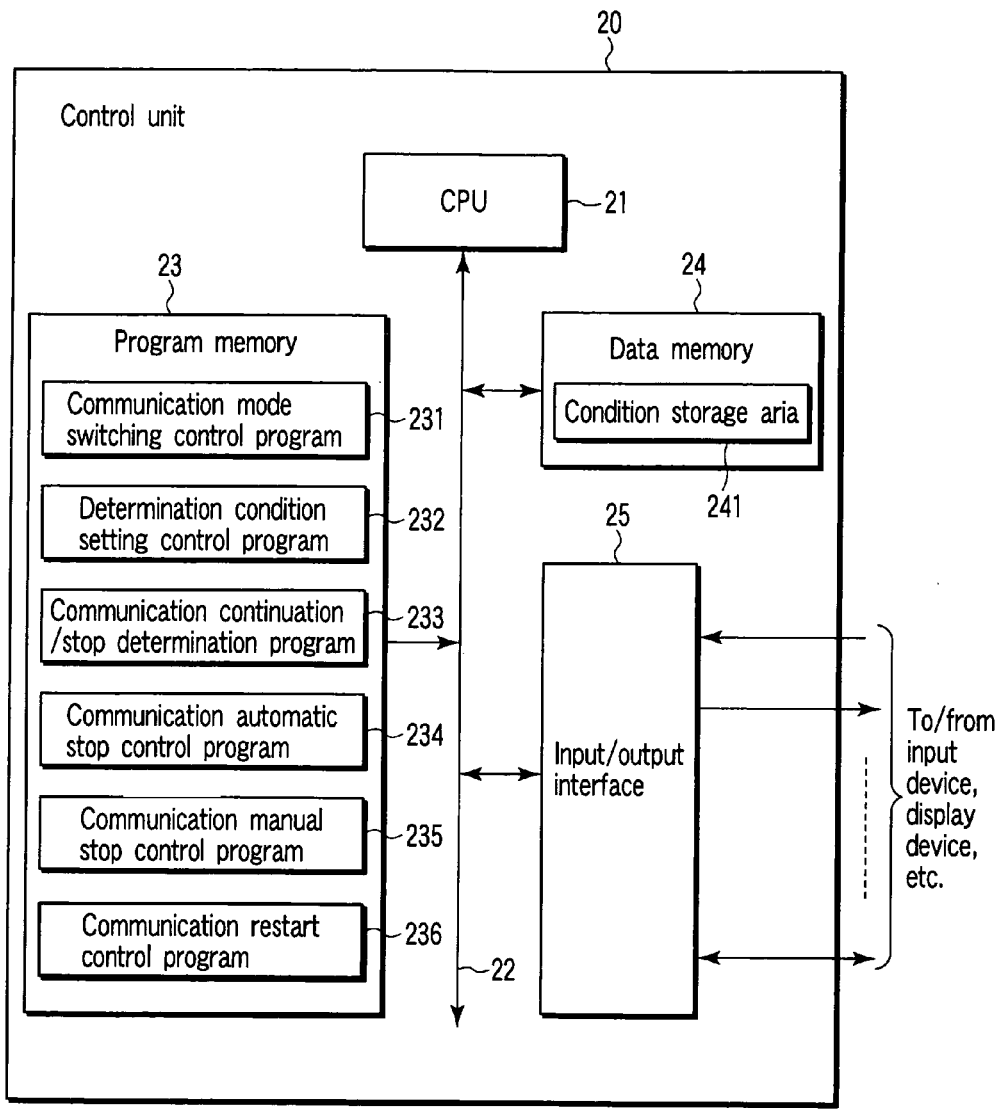
F I G. 2

MOBILE COMMUNICATION TERMINAL

CROSS-REFERENCE TO RELATED APPLICATIONS

This application is based upon and claims the benefit of priority from prior Japanese Patent Application No. 2006-001575, filed Jan. 6, 2006, the entire contents of which are incorporated herein by reference.

BACKGROUND OF THE INVENTION

1. Field of the Invention

The present invention relates to a mobile communication terminal, such as a mobile phone and a personal digital assistant (PDA). More specifically, the present invention relates to a mobile communication terminal connectable to a plurality of base stations different in communication rate.

2. Description of the Related Art

Heretofore, the cdma2000 1x system by Qualcomm has been employed as a mobile communication scheme. This system widens the band in the cdmaOne system and realizes a maximum communication rate of 163.2 Kbps in a downlink direction (direction form base station to mobile communication terminal) and a maximum communication rate of 86.4 Kbps in an uplink direction (direction from mobile communication terminal to base station).

On the other hand, recently, the cdma2000 1x-EVDO system has been developed as a high-data-rate mobile communication scheme. The cdma2000 1x-EVDO system is a standardized high-data-rate (HDR) system which is an expanded system of cdma2000 1x. And the cdma2000 1x-EVDO system is standardized as STD.T-64 IS-2000 C.S.0024 "cdma2000 high-rate packet data air interface specification" of the Association of Radio Industries and Businesses (ARIB) in Japan. EVDO is an abbreviation of 'evolution data only'.

The cdma2000 1x-EVDO system switches a modulation system of data to be transmitted from the base station to the mobile communication terminal on the basis of information showing a reception quality of the mobile communication terminal notified therefrom. Thereby, the cdma2000 1x-EVDO system can perform data communication by using a communication rate which is high in speed but low in error resistance when the reception quality in the mobile communication terminal is excellent, or by using a communication rate which is low in speed but high in error resistance when the reception quality in the mobile communication terminal is deteriorated. The communication rate in the cdma2000 1x-EVDO system becomes a maximum of 2.4 Mbps in the downlink direction and a maximum of 153.6 Kbps in the uplink direction and the cdma2000 1x-EVDO system can perform a significant high-speed data communication in comparison with the cdma2000 1x system.

By the way, in a current system, as disclosed in, for example, Japanese Patent Application Publication (KOKAI) No. 2002-345019, both base stations using the cdma2000 1x system and the cdma2000 1x-EVDO system are employed, therefore, even in the mobile communication terminal, a hybrid terminal equipped with a function corresponding to above-mentioned both systems has been developed. The use of this kind of communication terminal realizes a constantly stable data communication by selecting the aforementioned cdma2000 1x system and cdma2000 1x-EVDO system in response to communication rates which can be expected at each time.

However, the conventional mobile communication terminal has the following problems. That is to say, when the mobile communication terminal moves from a radio area where the communication terminal can use the cdma2000 1x-EVDO system to a radio area where the communication terminal cannot use the cdma2000 1x-EVDO system, so-called hand-off, in which a base station being a communication destination is switched from the base station in the cdma2000 1x-EVDO system to the base station in the cdma2000 1x, is performed. And in a state where the communication terminal performs a communication in the cdma2000 1x-EVDO system, even when the communication quality at the communication terminal deteriorates, the base station of the communication destination is switched to the base station in the cdma2000 1x system in any condition. Therefore, for example, if it is assumed that the communication terminal moves while downloading data from the base station in the cdma2000 1x-EVDO system and the base station of the communication destination is handed off from the base station in the cdma2000 1x-EVDO system to the base station in the cdma2000 1x. Then, a transmission rate of the data is extremely lowered and an unexpected time is taken for downloading the data sometimes, and this situation gives much annoyance to a user of the terminal.

BRIEF SUMMARY OF THE INVENTION

An object of the present invention is to provide a mobile communication terminal which prevents a data communication from being continued in any condition when a base station of a communication destination is switched during data communication to lower a communication rate and can always make an optimum data communication in accordance with a user's intention.

In order to achieve the above object, according to an aspect of a mobile communication terminal according to the present invention, when the base station of the communication destination is switched from a second base station with a second communication rate to a first base station with a first communication rate lower than the second communication rate, before this switching, the terminal predicts the remaining communication time necessary to complete the data communication from the switching time point on the basis of the remaining amount of data which has not been communicated yet and the aforementioned first communication rate. The terminal, then, informs the predicted remaining communication time to a user of the terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary block diagram showing a configuration of a mobile phone being an embodiment of a mobile communication terminal regarding the present invention;

FIG. 2 is an exemplary block diagram showing a functional configuration of a control unit of the mobile phone shown in FIG. 1;

DETAILED DESCRIPTION OF THE INVENTION

Figure 3:
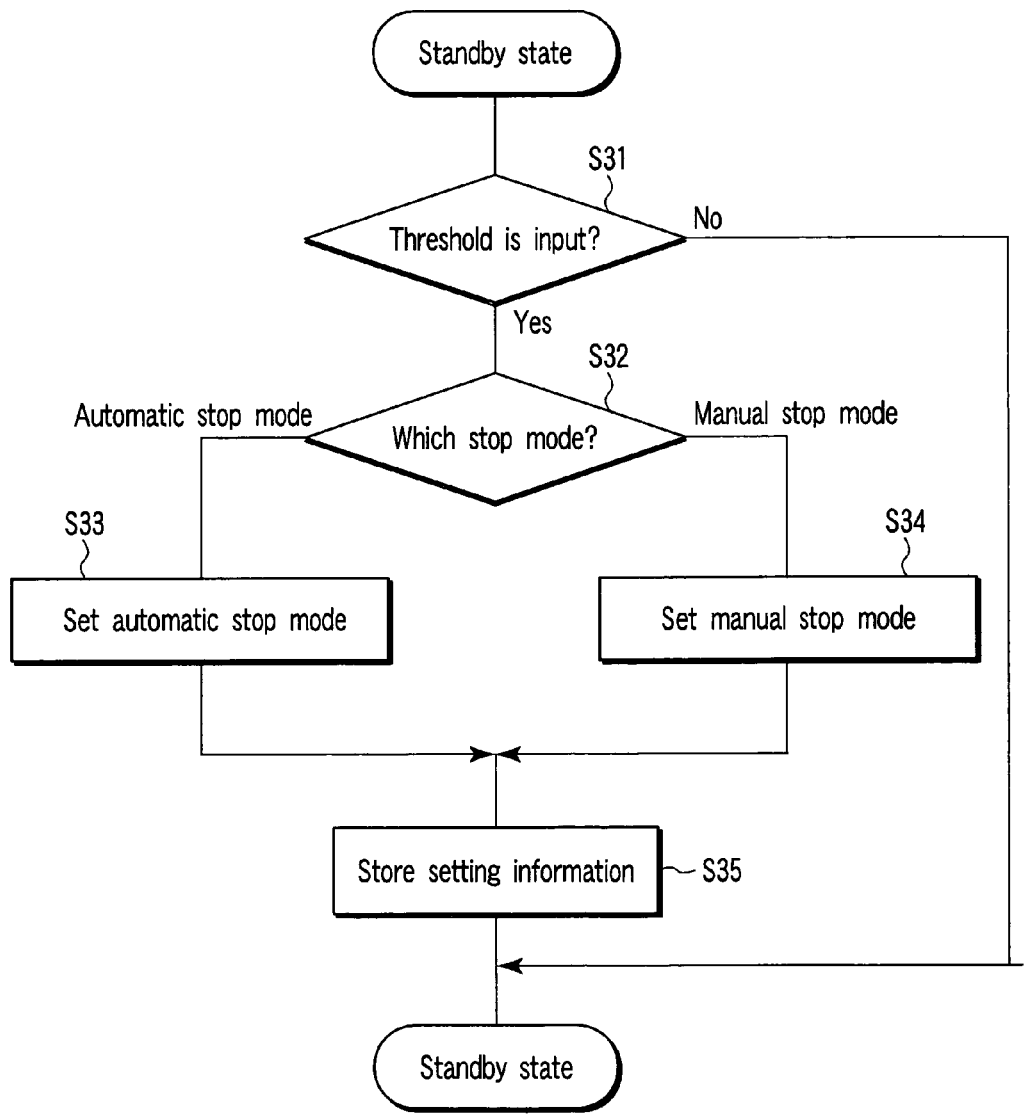
FIG. 3 is an exemplary flowchart showing a procedure and a content of determination condition setting control by the control unit shown in FIG. 2.

At first, brief outlines of embodiments of a mobile communication terminal regarding the present invention will be described.

In the first aspect of the mobile communication terminal according to the present invention, when a base station of a communication destination is switched from a second base station with a second communication rate to a first base station with a first communication rate lower than the second communication rate, before this switching, the terminal predicts the remaining communication time necessary to complete data communication from the switching time point on the basis of the remained amount of data which has not communicated yet and the aforementioned first communication rate. The terminal, then, informs the predicted remaining communication time to a user of the terminal.

Accordingly, when a base station of a communication partner is switched from the second base station with a high communication rate to the first base station with a low communication rate in the midst of the data communicating, a remaining communication time necessary to complete a data communication under the low communication rate is predicted and it is presented to the user. Therefore, the user can arbitrarily specify whether the data communication should be continued or stopped after confirming the remaining communication time on the basis of the presentation thereof.

In the second aspect of the mobile communication terminal according to the present invention, when a base station of a communication destination is switched from a second base station with a second communication rate to a first base station with a first communication rate lower than the second communication rate, before this switching, the terminal predicts the remaining communication time necessary to complete a data communication from the switching time point on the basis of the remaining amount of data which has not communicated yet and the aforementioned first communication rate and determines whether or not the remaining communication time is shorter than a predetermined threshold by comparing the predicted remaining communication time to the threshold. As the determination result, when the remaining communication time is shorter than the threshold, the data communication with the base station having the first communication rate is continued. In contrast, when the remaining communication time is longer than the threshold, the data communication with the base station having the first communication rate is stopped.

Accordingly, when the base station of the communication partner is switched from the second base station with the second communication rate to the first base station with the first communication rate during the data communication, the terminal predicts the remaining communication time necessary to complete a communication under the first communication rate and compares the remaining communication time with the threshold. Then, the terminal conducts continuation processing or conducts stop processing of the data communication on the basis of the comparison result. That is, the terminal automatically determines whether the data communication should be continued or stopped. Then, processing is executed, based on the determination result. Therefore, the second embodiment avoids user's operations when the predicted value of the remaining communication time is shorter than the threshold and can improve an operational property of the mobile communication terminal.

In the third aspect of the mobile communication terminal according to the present invention has a means for accepting an input of a setting instruction of an automatic stop mode or of a setting instruction of a manual operation stop mode from the user and for storing the set and instructed mode. Before switching the communication partner, the terminal predicts the remaining communication time necessary to complete the data communication from the switching time point on the basis of the remained amount of the data which has not communicated yet and the first communication rate and. determines whether or not the remaining communication time is longer or shorter than the threshold by comparing the predicted remaining communication time to the threshold. As the determination result, when the remaining communication time is shorter than the threshold, the terminal continues the data communication with the first base station. In contrast, when the remaining communication time is longer than the threshold, the terminal determines whether the automatic stop mode is stored or the manual stop mode is stored and if the automatic stop mode is stored, then, stops the data communication with the first base station. In contrast, when it is determined that the manual stop mode is stored, the terminal presents the predicted remaining communication time and accepts an input of a communication continuation instruction or a communication stop instruction from the user in this situation. When the communication continuation instruction is input, the terminal continues the data communication with the first base station, and in contrast, and when the communication stop instruction is input, it stops the data communication therewith.

Accordingly, if the predicted value of the remaining communication time is shorter than the threshold, the terminal automatically continues the data communication, and in contrast, if the predicted value of the remaining communication time is longer than the threshold, the terminal executes the automatic stop processing or manual stop processing in accordance with the mode preset by the user.

Next to this, the embodiments of the present invention will be described in detail by referring to the drawings.

FIG. 1 is a block diagram showing a configuration of a mobile phone being an embodiment of a mobile communication terminal regarding the present invention. A radio signal transmitted from a base station (not shown) is received by an antenna 1 to be input to a radio unit 2. The radio unit 2 is composed of an antenna duplexer (DUP) 3, a reception unit 4 and a transmission unit 5. The DUP 3 inputs the radio signal received by the antenna 1 to the reception unit 4 and also outputs a radio signal output from the transmission unit 5 to the antenna 1.

The reception unit 4 has an EVDO-compliant reception circuit 41, a 1x-compliant reception circuit 42 and a switching circuit (not shown). The reception circuit 41 down-converts the radio signal transmitted from the base station in the cdma2000 1x-EVDO system into an intermediate signal to orthogonally demodulate it and inputs the received base band signal to a CDMA signal processing unit 6. The reception circuit 42 down-converts the radio signal transmitted from the base station in the cdma2000 1x system into an intermediate signal to orthogonally demodulate it and inputs the received base band signal to the CDMA signal processing unit 6. The switching circuit selectively connects one of the reception circuits 41 and 42 between the DUP 3 and the processing unit 6 in response to a switching control signal output from a control unit 20.

The processing unit 6 has a RAKE receiver. The RAKE receiver applies reverse spreading processing to a plurality of path signals included in the received base band signal by spreading codes, respectively, to reproduce them. The processing unit 6 then adjusts phases of each reproduced path signal to composite them. Thus, reception packet data in a prescribed transmission format is obtained. The packet data is input to a compression/extension processing unit (hereinafter, referred to as compander) 7.

The compander 7 separates the packet data output from the processing unit 6 into video data, audio data and text data by a multiple-separation unit and applies decoding processing to each of the separated data, respectively. For example, if the audio data is included in the packet data, the processing unit 6 decodes the audio data though a speech codec. And if the video data is included in the packet data, it is decoded through a video codec.

Digital audio signal obtained through the foregoing decoding processing is supplied to a PCM code processing unit (hereinafter, referred to as PCM codec) 8. The PCM codec 8 applies PCM decoding to a digital audio signal output from the compander 7 to output an analogue audio signal. This analogue audio signal is amplified by a reception amplifier 9 to be output from a loud speaker 10.

A digital video signal decoded though the video codec in the compander 7 is input to a control unit 20. The control unit 20 displays the digital video signal output from the compander 7 onto a display device 15 via a video RAM. The display device 15 consists of a liquid crystal device (LCD). The control unit 20 displays not only the received video data but video data imaged by a camera (not shown) via the video RAM onto the display device 15.

The compander 7 outputs e-mail to the control unit 20 when the reception packet data is the e-mail. The control unit 20 stores the e-mail in a mail storing area in a storage unit 13. The control unit 20 reads out the e-mail from the storage area in response to a display operation applied by the user through an input device 14 to display it on the display device 15. The display device 15 also displays information indicating an operation mode of the mobile phone, information notifying an incoming call, information indicating the residual amount or a charging state of a battery 16, and a clock indicating a current time, etc.

On the other hand, a voice signal of a user input in a microphone 11 is amplified by a transmission amplifier 12 to an appropriate degree to be applied PCM encoding processing through the PCM codec 8 and converted into the digital audio signal to be input to the compander 7. The video signal output from the camera (not shown) is digitalized by the control unit 20 to be input to the compander 7. The e-mail created in the control unit 20 is also input to the compander 7 from the control unit 20.

The compander 7 detects an energy amount of input voice from the digital audio signal output from the PCM codec 8 to decide a transmission data rate on the basis of the detection result. The compander 7 then encodes the digital audio signal into a signal in a format corresponding to the transmission data rate, and thereby, generates audio data. And the comparator 7 encodes the digital video signal output from the control unit 20 to generate video data. Further, the comparator 7 multiplexes the audio data and video data though the multiple-separation unit into the prescribed transmission format to generate the transmission packet data and outputs the packet data to the CDMA signal processing unit 6. Even when the e-mail is output from the control unit 20, the comparator 7 converts it into the packet data.

The processing unit 6 applies spread spectrum processing to the packet data output from the compander 7 by using spread codes assigned to a transmission channel. Then, the processing unit 6 outputs the processed output-signal to the transmission unit 5.

The transmission unit 5 includes an EVDO-compliant transmission circuit 51, a 1x-compliant transmission circuit 52 and a switching circuit (not shown). The EVDO-compliant transmission circuit 51 modulates the transmission signal with the spectrum spread processing applied thereto, by using a digital modulation method, such as a quadrature phase shift keying (QPSK) system or a quadrature amplitude modulation (QAM) system in a state in which a communication with the base station in the cdma2000 1x-EVDO system is made. And the transmission unit 5 up-converts the transmission signal generated through the modulation into a radio signal and further high-frequency-amplifies it up to a transmission power level instructed from the control unit 20 to output it. The amplified radio signal is supplied to the antenna 1 via the DUP 3 and transmitted from the antenna 1 toward the base station in the cdma2000 1x-EVDO system.

The 1x-compliant transmission circuit 52 modulates the transmission signal with the spectrum spread processing applied thereto, by using the digital modulation system, such as a QPSK system in a state in which a communication with the base station in the cdma2000 1x system is made. The transmission circuit 52 up-converts the transmission signal generated by the demodulation into a radio signal, and further, high-frequency-amplifies it up to the transmission power level instructed from the control unit 20 to output it. The amplified radio signal is supplied to the antenna 1 via the DUP 3 and transmitted from the antenna 1 toward the base station in the cdma2000 1x system.

The switching circuit selectively connects one of the transmission circuits 51 and 52 between the CDMA signal processing unit 6 and the DUP 3 in response to the switching control signal output from the control unit 20.

The input device 14 has a dial key and a plurality of function keys. A power supply circuit 17 generates a specified operation power supply voltage Vcc on the basis of a power. output from the battery 16 to supply to each unit. The battery 16 is charged by a changing circuit 18 depending on the commercial power.

By the way, the control unit 20 is provided with a microcomputer and configured as follows. FIG. 2 is a block diagram showing the configuration. The control unit 20 has a central processing unit (CPU) 21. The CPU 21 is respectively connected to a program memory 23, a data memory 24 and an input/output interface (input/output I/F) 25.

The input/output I/F 25 performs input/output processing of the control signal and the data for the radio unit 2, CDMA signal processing unit 6, compander 7, PCM codec 8, storage unit 13, input device 14 and display device 15.

The program memory 23 stores a communication mode switching program 231, a determination condition setting control program 232, a communication continuation/stop determination program 233, a communication automatic stop control program 234, a communication manual stop control program 235 and a communication restart control program 236 are stored as application programs necessary to implement the present invention.

In accordance with the time when handing-off the communication destination from the base station in the cdma2000 1x-EVDO system to the base station in the cdma2000 1x system during the data communication, the communication mode switching control program 231 makes the CPU 21 execute processing to switch the communication mode of its own terminal from the cdma2000 1x-EVDO system to the cdma2000 1x system.

The determination condition setting control program 232 makes the CPU 21 execute processing to receive determination conditions which is input by the user through the input device 14 via the input/output I/F 25 and store it in a condition storage area 241 in the data memory 24. The determination conditions which is input include a threshold to determine whether the data communication should be continued or stopped when the communication mode is switched and stop mode information to specify which of the automatic stop mode and the manual stop mode is appropriate for stopping the data communication.

When the communication mode is switched from the cdma2000 1x-EVDO system to the cdma2000 1x system, before this switching, the communication continuation/stop determination program 233 calculates the remaining communication time from the amount of the data which has not communicated yet and the data transmission rate in the cdma2000 1x system. Then, by comparing the calculated remaining communication time to the threshold stored in the storage area 241, the continuation/stop program 233 makes the CPU 21 execute processing to determine whether the data communication should be continued or discontinued even after switching to the cdma2000 1x system.

When the communication continuation/stop determination program 233 determined that the data communication should be stopped and also the automatic stop mode is stored in the storage area 241, the communication automatic stop control program 234 makes the CPU 21 execute processing to stop the data communication on the way and shift to a standby state. In the aforementioned stop processing, the CPU 21 generates break information necessary to restart the interrupted data communication to store it in the storage area 241.

The communication manual stop control program 235 makes the CPU 21 execute the following processing. That is, when it is determined that the data communication should be stopped by the communication continuation/stop determination program 233 and also the manual stop mode is stored in the condition storage area 241, the communication manual stop control program 235 generates a message to inquire whether the data communication should be continued or discontinued to the user and displays it on the display device 15. If the user inputs a stop request through the input device 14 in this situation, the CPU 21 stops the data communication on the way to shift into the standby state. At this time, the CPU 21 generates the break information necessary to restart the data communication stopped in the foregoing stop processing and stores it in the storage area 241. In contrast, if the user inputs the continuation instruction, the CPU 21 continues the data communication with the base station in the cdma2000 1x after the switching. And also in this case, the CPU 21 generates the break information necessary to restart the data communication which has been discontinued in the aforementioned stop processing and stores it in the storage area 241.

When the-break information is stored in the storage area 241, the communication restart control program 236 tries to grasp the base station in the cdma2000 1x-EVDO periodically in the standby state. And the restart control program 236 makes the CPU 21 execute to start fresh the data communication which has been discontinued in accordance with the stop information from the start when it becomes possible for the data communication to be performed with the base station in the cdma2000-1x-EVDO system.

The data memory 24 includes the condition storage aria 241. This storage area 241 is used to store the threshold and the stop information the input of which are accepted by the determination condition setting control program 232 and to store the stop information generated by the communication automatic stop control program 234 or by the communication manual stop control program 235.

Hereinafter, operations of the mobile phone which has been configured as mentioned above will be described.

(1) Setting Processing of Determination Conditions

The CPU 21 executes the setting control of the determination conditions as follows prior to the execution of continuation/stop control of the data communication. FIG. 3 is a flowchart showing its control procedure and control content.

In the standby state, the CPU 21 monitors the input of the threshold in a step S31 in the state where the determination condition setting mode has been selected. In this state, when the user inputs the threshold though the input device 14, the CPU 21 receives information indicating the input threshold via the input/output I/F 25. The threshold is used for determining the remaining communication time, then, it is input as a time value.

In a step S32, the CPU 21 then displays a selection menu for the stop mode onto the display device 15 to monitor the input of the stop mode. In this state if the user selectively inputs by means of the input device 14 either the automatic stop mode or manual stop mode from among the selection menu of the displayed stop modes, the CPU 21 receives the stop mode which has been selectively input, via the input/output I/F 25. If the automatic stop mode is selected, the CPU 21 shifts to a step S33 and generates setting information of the automatic stop mode. In contrast, if the manual stop mode is selected, the CPU 21 shifts to a step S34 and generates setting information of the manual stop mode.

Finally, in a step S35, the CPU 21 stores the information about the received threshold and the setting information of the generated automatic stop mode or the setting information of the manual stop mode in the storage area 241 in the data memory 24. Then, the mobile phone returns to the standby state after completing the storage processing.

(2) Continuation/Stop Processing of Data Communication

Figure 4:
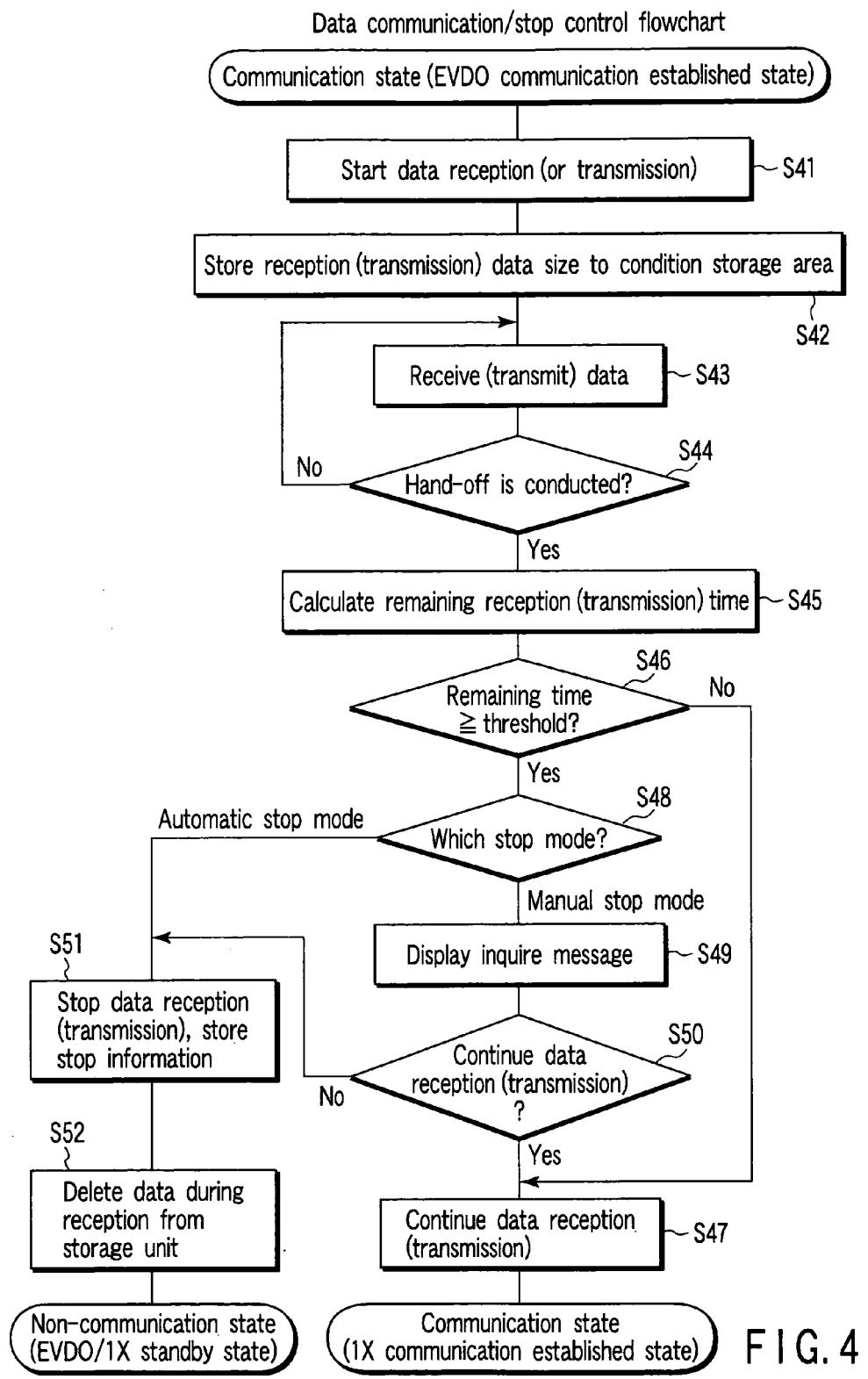
FIG. 4 is an exemplary flowchart showing a procedure and a content of data communication continuation/stop control.

In the state in which the base station in the cdma2000 1x-EVDO system has been grasped, it is assumed that the user operates the input device 14 to download content data from a content delivery sever (not shown) or operates to transmit data to other communication terminals. The CPU 21 then executes control for the data communication as follows. FIG. 4 is a flowchart showing its control procedure and control content.

When starting controlling a reception or a transmission of the data in a step S41, the CPU 21 firstly acquires a communication data size to store it in the condition storage area 241 in the data memory 24 in a step S42. For, example, in the case of reception of the data, the CPU 21 acquires a total size of the data to be received from header information of the reception data. In contrast, in the case of transmission of the data, the CPU 21 acquires a total size of the data to be transmitted therefrom. The CPU 21 then stores the total sizes of the data in the storage area 241. After storing the total sizes of the data, the CPU 21 executes reception or transmission control in a step S43. Thus, in the case of reception, the data on the content, etc., downloaded from a content server, etc., is received to be stored in the storage unit 13. In contrast, in the case of transmission, the data, such as e-mail read out from the storage unit 13 or data memory 24 is transmitted.

During the implementation of the foregoing reception or transmission of the data, the CPU 21 monitors hand-off in a step S44. In this state, if it is assumed that the user moves from a radio area formed by the base station in the cdma2000 1x-EVDO system to a radio area formed by the base station in the cdma2000 1x system, then, the CPU 21 executes so-called hand-off control, switching the communication partner from the base station in the cdma2000 1x-EVDO system to the base station in the cdma2000 1x system.

For executing the aforementioned hand-off, the CPU 21 executes the data communication continuation/stop control as follows. That is, at first, in a step S45, the CPU 21 computes the remaining communication time from the amount of the data which has not communicated yet and the data transmission rate in the cdma2000 1x system. The amount of the data which has not communicated yet is computed as follows.

That is to say, in the case of reception, the CPU 21 computes the amount of the data which has not communicated yet by subtracting a packet amount or data amount which has already been received from the total sizes of the reception data stored in the storage area 241. In contrast, in the case of transmission, the CPU 21 can obtain the amount of the not communicated data by subtracting the packet amount or data amount already transmitted from the total sizes of the transmission data stored in the storage area 241. The packet amount is obtained in a protocol layer and the data amount is obtained in an application layer. The communication rate in the cdma2000 1x can be computed on the basis of, for example, throughput in a previous fixed period.

Further, the COU 21 compares the remaining communication time computed with the threshold stored in the storage area 241 in a step S46 to determine whether the data communication should be continued even after switching to the cdma2000 1X system. If the remaining communication time is shorter than the threshold, the CPU 21 shifts to a step S47 then downloads data successively or transmits data, such as e-mail, after switching to the cdma2000 1x system.

On the contrary, if the remaining communication time is longer than the threshold as the determination result, the CPU 21 shifts to a step S48 to determine the stop mode therein. If the setting information on the automatic stop mode has been stored in the storage area 241, the CPU 21 shifts to a step S51 to stop the down load or transmission of the data after that and stores the stop information in the storage area 241 for the coming restart of the data communication. And in a step S52, the CPU 21 deletes data received in a period until the data communication has been stopped and stored in the storage unit 13 to shift to the standby state.

In contrast, if it is assumed that the setting information on the manual stop mode has been stored in the storage area 241, in this case, the CPU 21 shifts to a step S49 to generate the message to inquire about the continuation or discontinuation of the data communication to the user and displays it on the display device 15. In this situation, if the user inputs a stop request through the input device 14, the CPU 21 makes a shift to a step S51 and stops the reception or transmission of the data on the way to shift in the standby state. Even in this case, the stop information is generated and prepared for restarting the data communication. Further, the stop information is stored in the storage area 241 and also the data which has already been received and stored in the storage unit 13 is deleted.

On the contrary, it is assumed that the user input the continuation instruction of the data communication, in this case, the CPU 21 shifts to a step S47 to download data or transmit e-mail or the like successively after switching to the cdma2000 1x system.

If the user having the corresponding mobile phone moves again to the radio area of the base station in the cdma2000 1x-EVDO system during continuous data communication with the base station in the cdma2000 1x system, the CPU 21 continues in any condition the data communication with the base station in the cdma2000 1x-EVDO system after the base station in the cdma2000 1x-EVDO system is grasped to allow the data communication to be made. In this case, the mobile phone may be configured not to continue the data communication in any condition, but to predict the current rate of the communication with the base station in the cdma2000 1x-EVDO and to continue the data communication if the predicted communication rate is higher than the threshold.

(3) Restart Processing of Data Communication after Stopping It

Figure 5:
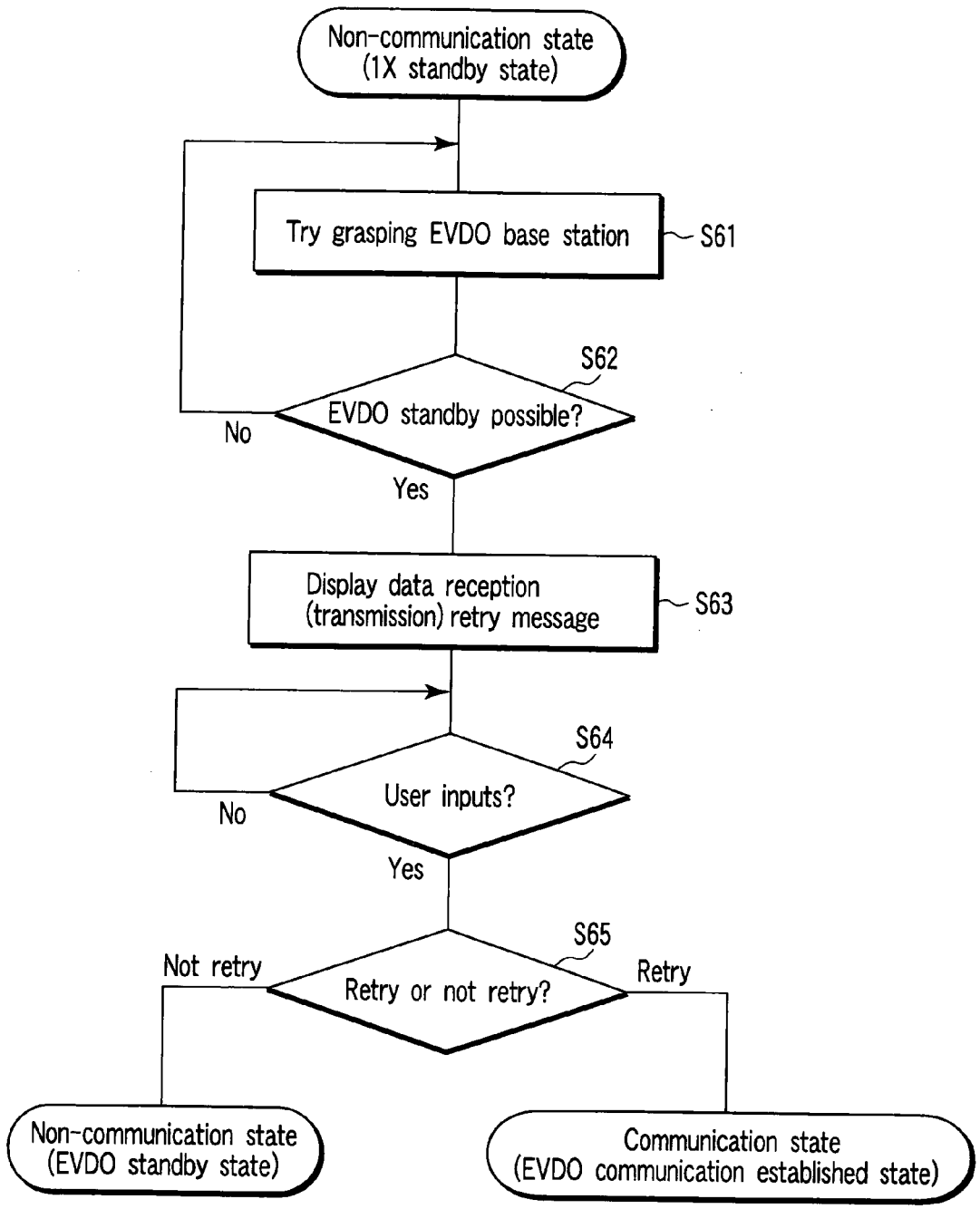
FIG. 5 is an exemplary flowchart showing a procedure and a content of communication restart control by the control unit shown in FIG. 2.

The CPU 21 executes data communication restart control as follows when the data communication is discontinued. FIG. 5 is a flowchart showing its control procedure and control content.

That is, when the stop information is stored in the condition storage area 241, the CPU 21 tries grasping the base station in the cdma2000 1x-EVDO system periodically in a step S61 in the standby state. When being allowed the data communication with the base station in the cdma2000 1x-EVDO system, the CPU 21 shifts from a step S62 to a step S63. Wherein the CPU 21 generates the message for inquiring to the user whether the user retries the data communication and displays the message on the display device 15 via the input/output I/F 25.

In this state, it is assumed that the user has selectively input 'retry' by means of the input device 14, then, the CPU 21 confirms this input instruction is a step S65 and afterward restarts the data communication with the base station in the cdma2000 1x-EVDO system, based on the stop information stored in the storage aria 241. In contrast, if the user has selectively input 'does not retry' by means of the input device 14, the CPU 21 releases a radio link to the base station in the cdma2000 1x-EVDO to return to the standby state. For returning to the standby state, the CPU 21 deletes the stop information stored in the storage area 241.

As mentioned above, when handing-off from the base station in the cdma2000 1x-EVDO system to the base station in the cdma2000 1x system during the data communication, the mobile phone in this embodiment calculates the remaining communication time of the foregoing data communication to compare it with the threshold. And if the remaining communication time is smaller than the threshold, the mobile phone in this embodiment continues the data communication with the base station in the cdma2000 1x system. In contrast, if the remaining communication time is larger than the threshold and also the automatic stop mode is set in advance, the mobile phone in this embodiment stops the data communication to sift to the standby state. On the contrary, if the manual stop mode has been set, the mobile phone in this embodiment displays the message for inquiring to the user whether the user continues the data communication and when the user selects the discontinuation of the data communication, the mobile phone stops the data communication to make a shift to the standby state. In contrast, if the user selects the continuation of the data communication, the mobile phone continues it with the base station in the cdma2000 1x system.

Accordingly, the data communication is continued at least when the amount of the remaining communication data is smaller than the threshold or only when the user itself selectively inputs the instruction for the continuation of the data communication. Therefore, the user has no need to worry about the continuation of the data communication in any condition after handing-off, thereby, the user can prevents inconvenience in which an expected long time is taken and a communication cost for the data communication is increased.

By setting the automatic stop mode, if the amount of the remaining communication data is not less than the threshold, the mobile phone automatically stops the data communication. Thereby, the user does not need to perform stop operations for the data communication at each time. And also the user can arbitrarily set the threshold, so that the user can reflect its intention for the automatic continuation and automatic stop of the data communication.

Furthermore, in the case of discontinuation of the data communication, the mobile phone in the embodiment stores the stop information needed to restart the data communication afterward and tries the grasping of the base station in the cdma2000 1x-EVDO periodically in the standby state. If the data communication with the base station in the cdma2000 1x-EVDO becomes available, the mobile phone restarts the data communication. Accordingly, the user needs not to conduct again the operation to perform the data communication then the user can improve the operability of the mobile phone.

Further, before the restart of the data communication, when the mobile phone inquires to the user whether the user wants to retry the data communication and if the user selects 'retry', the mobile phone restarts the data communication. And on the contrary, if the user selects 'non-retry' then the mobile phone does not restart the data communication. Therefore, the user can reflect its intention even for the property of the restart of the data communication.

The present invention is not limited to the above-mentioned embodiments. For example, in the embodiments, the threshold is set and the data communication is automatically continued when the size of the remaining communication data is smaller than the threshold. However, the present invention is not to limited to this case, and the mobile phone can be configured to continue the data communication when the user instructs the continuation of the data communication by inquiring to the user whether the user intends to continue or discontinue the data communication even at any data quantity of the size of the remaining communication data without having to set the threshold.

In the aforementioned embodiments, although the mobile phone has the manual stop mode to inquire to the user whether the user intends to continue or discontinue the data communication in the case where the size of the remaining communication data exceeds the threshold, and when the user instructs the stop of the data communication, the mobile phone stops the data communication. However, the invention is not limited to this embodiment, the mobile phone can stop the data communication in any condition without inquiring to the user when the size of the remaining communication data exceeds the threshold by having only the automatic stop mode.

In contrast, with having only the manual stop mode, the mobile phone inquires to the user whether the user wants to continue or discontinue the data communication when the size of the remaining communication data exceeds the threshold and can stop the data communication when the user instructs the discontinuation of the data communication as an answer for the inquiring.

Furthermore, in the embodiments, the processing of grasping the base station in the cdma2000 1x-EVDO system is repeated without any limit, based on the stop information. However, the invention is not limited to these embodiments; an upper limit of the number of repetitions may be decided in advance.

Further, in the embodiments, when the reception of the data is stopped, the whole data which has already been received and stored is deleted. However the invention is not limited to these embodiments, the mobile phone may store the received and stored data without deleting it and receive the data which has not received yet when data reception is restarted. This reception can be achieved, for example, by putting numbers to packets and storing the number of the packet which has received just before the stop of the data communication while including this number in the stop information.

Further, having described the embodiments as examples, in which the hand-off is conducted between the base station in the cdma2000 1x-EVDO system and the base station in the cdma2000 1x, the present invention can be employed in any system as long as the hand-off are performed among a plurality of base stations different in communication rate.

Furthermore, the present invention can be implemented in a variety of modifications without departing from the sprit of the invention, even in the mobile communication terminal for its kind, configuration, and procedures and contents of the determination condition setting control, data communication continuation/stop control and communication restart control.

In short, the present invention is not limited to the specific embodiment just as described above, and in the stage of the implementation, it is obvious that modifications and concrete variations of the present invention are possible without departing from the sprit and the scope of the invention. It is further understood that a variety of inventions can be formed by appropriately combining a plurality of constituent elements disclosed in the foregoing embodiments. For example, some of the constituent elements may be eliminated from the entire constituent elements shown in the embodiments. Furthermore, the constituent elements extending over the different embodiments may be combined appropriately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal for communicating a data with a first base station or a second base station, comprising:
   a first communication unit configured to perform the data communication with the first base station at a first communication rate;
   a second communication unit configured to perform the data communication with the second base station at a second communication rate higher than the first communication rate;
   a first control unit coupled to the first communication unit and the second communication unit, and configured to switch from the second base station to the first base station during a period in which the data communication with the second base station is performed;
   a second control unit coupled to the second communication unit, and configured to calculate a remaining communication time necessary to complete the data communication from a switching time point on the basis of a remaining amount of data which has not communicated yet, before switching the communication partner; and
   a display unit coupled to the second control unit, and configured to display the calculated remaining communication time.

2. The mobile communication terminal according to claim 1, further comprising:

an input unit configured to accept a communication continuation instruction or a communication stop instruction when the display unit displays the calculated remaining communication time, and wherein the first control unit is configured to continue the data communication with the first base station if the communication continuation instruction is input, and is configured to stop the data communication with the first base station if the communication stop instruction is input.

3. The mobile communication terminal according to claim 2, further comprising:

a storage unit configured to store a stop information when the data communication with the first base station is stopped, and wherein the second communication unit is configured to execute a trial to be connected between the second base station and the mobile communication terminal in a state where the stop information is stored;

the display unit is configured to display an inquire message whether the stopped data communication should be restarted or not when between the second base station and the mobile communication terminal is connected by the trial;

the input unit is configured to accept an input for a communication restart instruction in a state where the inquire message is informed; and the first control unit is configured to restart the stopped data communication with the connected between the second base station and the mobile communication terminal if the communication restart instruction is input.

4. The mobile communication terminal according to claim 2, further comprising:

a storage unit configured to store stop information when the data communication with the first base station is stopped, and wherein the second communication unit is configured to execute a trial to be connected between the second base station and the mobile communication terminal in a state where the stop information is stored; and the first control unit is configured to restart the stopped data communication with the connected between the second base station and the mobile communication terminal if between the second base station and the mobile communication terminal is connected by the trial.

5. A mobile communication terminal for communicating a data with a first base station or a second base station, comprising:

a first communication unit configured to perform the data communication with the first base station at a first communication rate;

a second communication unit configured to perform the data communication with the second base station at a second communication rate higher than the first communication rate;

a first control unit coupled to the first communication unit and the second communication unit, and configured to switch from the second base station to the first base station during a period in which the data communication with the second base station is performed;

a second control unit coupled to the first communication unit, and configured to calculate a remaining communication time necessary to complete the data communication from a switching time point on the basis of a remaining amount of data which has not communicated yet, before switching the communication partner; and a third control unit coupled to the first control unit and the second control unit, configured to continue the data communication with the first base station if the remaining communication time is shorter than a threshold, and configured to stop the data communication with the first base station if the remaining communication time is longer than the threshold.

6. The mobile communication terminal according to claim 5, further comprising:

a input unit configured to accept an input of the threshold from a user.

7. The mobile communication terminal according to claim 5, further comprising:

a storage unit configured to store a stop information when the data communication with the first base station is stopped, and wherein the second communication unit is configured to execute a trial to be connected between the second base station and the mobile communication terminal in a state where the stop information is stored;

the display unit is configured to display an inquire message whether the stopped data communication should be restarted or not when between the second base station and the mobile communication terminal is connected by the trial;

the input unit is configured to accept an input for a communication restart instruction in a state where the inquire message is informed; and the first control unit is configured to restart the stopped data communication with the connected between the second base station and the mobile communication terminal if the communication restart instruction is input.

8. The mobile communication terminal according to claim 5, further comprising:

a storage unit configured to store stop information when the data communication with the first base station is stopped, and wherein the second communication unit is configured to execute a trial to be connected between the second base station and the mobile communication terminal in a state where the stop information is stored; and the first control unit is configured to restart the stopped data communication with the connected between the second base station and the mobile communication terminal if between the second base station and the mobile communication terminal is connected by the trial.

9. A mobile communication terminal for communicating a data with a first base station or a second base station, comprising:

a first communication unit configured to perform the data communication with the first base station at a first communication rate;

a second communication unit configured to perform the data communication with the second base station at a second communication rate higher than the first communication rate;

a input unit configured to accept an input of a setting instruction of an automatic stop mode or an input of a setting instruction of a manual stop mode;

a first control unit coupled to the first communication unit and the second communication unit, and configured to switch from the second base station to the first base station during a period in which the data communication with the second base station is performed;

a second control unit coupled to the first communication unit, and configured to calculate a remaining communication time necessary to complete the data communication from a switching time point on the basis of a remaining amount of data which has not communicated yet, before switching the communication partner;

a third control unit coupled to the first control unit and the second control unit, configured to continue the data communication with the first base station if the remaining communication time is shorter than a threshold, and configured to stopping the data communication with the first base station if the remaining communication time is longer than the threshold and if automatic stop mode is input by the input unit;

a display unit configured to display the calculated remaining communication time if the manual stop mode is input and if the remaining communication time is longer than the threshold;

a fourth control unit configured to continue the data communication with the first base station if a communication continuation instruction is input by the input unit and after the display unit displays the calculated remaining communication time, and configured to stop the data communication with the first base station if the communication stop instruction is input by the input unit and after the display unit displays the calculated remaining communication time.

10. The mobile communication terminal according to claim 9, further comprising:

a storage unit configured to store a stop information when the data communication with the first base station is stopped, and wherein the second communication unit is configured to execute a trial to be connected between the second base station and the mobile communication terminal in a state where the stop information is stored;

the display unit is configured to display an inquire message whether the stopped data communication should be restarted or not when between the second base station and the mobile communication terminal is connected by the trial;

the input unit is configured to accept an input for a communication restart instruction in a state where the inquire message is informed; and the first control unit is configured to restart the stopped data communication with the connected between the second base station and the mobile communication terminal if the communication restart instruction is input.

11. The mobile communication terminal according to claim 9, further comprising:

a storage unit configured to store stop information when the data communication with the first base station is stopped, and wherein the second communication unit is configured to execute a trial to be connected between the second base station and the mobile communication terminal in a state where the stop information is stored; and the first control unit is configured to restart the stopped data communication with the connected between the second base station and the mobile communication terminal if between the second base station and the mobile communication terminal is connected by the trial.

* * * * *